United States Patent [19]

Laghi

[11] 4,436,496

[45] Mar. 13, 1984

[54] MOLD FOR A LIQUID INJECTION MOLDING COMPOSITION

[75] Inventor: Aldo A. Laghi, Saratoga, N.Y.

[73] Assignee: General Electric Company, Waterford, N.Y.

[21] Appl. No.: 272,242

[22] Filed: Jun. 10, 1981

[51] Int. Cl.³ .............................. B29F 1/05; B29G 3/00
[52] U.S. Cl. ................................... 425/543; 425/548; 425/564
[58] Field of Search ........................ 425/564, 548, 543

[56] References Cited

U.S. PATENT DOCUMENTS 2,865,050  12/1958  Strauss ............................ 425/564 X
2,878,515   3/1959  Strauss ............................ 425/564 X Primary Examiner—Thomas P. Pavelko

[57] ABSTRACT

A mold apparatus for liquid injection molding machine which mold is dripless comprising a frame, four support posts mounted on the frame; a conduit for a liquid molding composition slightly mounted on the forward end of the frame having a front end and a rear end; a first plate means having passage means therein for the passage of the liquid molding composition and fixedly mounted on the forward end of said conduit and adapted to slide within support means and within said mold frame means located adjacent to the forward end of said frame, nozzle means at the end of said passage means of said first plate means at the rear end of said mold frame means and away from said conduit means and pin means slidably mounted in said mold frame means adapted to open and close said nozzle means and mold cavity means slidably mounted on said support means adapted to move toward and away from said nozzle means.

11 Claims, 6 Drawing Figures

MOLD FOR A LIQUID INJECTION MOLDING COMPOSITION

BACKGROUND OF THE INVENTION

The present invention relates to liquid injection molding machines and more particularly the present invention relates to runnerless molds for liquid injection molding machines.

Silicone compositions are well known. One particular type of a silicone composition is known as an addition curing silicone composition. Addition curing silicone compositions in a broader sense comprise a vinyl containing diorganopolysiloxane polymer of a viscosity varying anywhere from 100–500,000 centipoises at 25° C., a hydrogen containing polysiloxane having a viscosity from 5 to 1,000 centipoise at 25° C. and a platinum catalyst. This composition in the presence of the platinum catalyst will crosslink to form a silicone elastomer.

There has been various modifications to this composition, for example, adding a vinyl containing resin to increase the strength of the cured composition without increasing undesirably the uncured viscosity of the composition. An important part of the technology of such compositions is the use of inhibitors. Thus, in the uncured state, such compositions are normally packaged with a vinyl containing siloxane or with a hydride polymer and the vinyl polysiloxane in one package such that no package contains the vinyl siloxane, the hydride and platinum catalyst. If all three ingredients are in the same package, the composition cures to a silicone elastomer. Such a composition is normally packaged in two components. With the use of inhibitors the composition has a shelf life of anywhere from several hours to six months or more. One type of a mild inhibitor is a methyl vinyl polysiloxane. This is an inhibitor mixed into the composition in the parts per million level and inhibits the composition such that it does not cure for short periods of time at room temperature but cures rapidly at elevated tempertures, that is temperatures of above 100° C. A more effective inhibitor is allyl isocyanurate disclosed in a patent of Burger ad Hardman U.S. Pat. No. 3,882,083 which is hereby incorporated by reference. Such an inhibitor gives a slightly more extended shelf life to the mixed composition before it cures to a silicone elastomer. Another effective inhibitor that has been found is diallymaleate. Diallymaleate is disclosed in the patent of Eckberg Ser. No. 4,256,870 now Pat. No. 4,256,870, which is hereby incorporated by reference. While the Ekberg inhibitor makes the composition with an extended shelf life of several days, nevertheless when the composition is heated at elevated temperatures at temperatures above 100° C. it cures in a matter of minutes and even seconds. However, there has been developed even more effective inhibitors which allow the three ingredients to be mixed without the compositions curing. One effective inhibitor for instance is the hydroperoxide compound of William J. Bobear disclosed in U.S. Pat. No. 4,061,609 which is hereby incorporated by reference. An effective amount of this hydroperoxide compound makes the composition stable in the mixed state, that is with the three ingredients mixed together and whatever other ingredients are necessary without curing for periods of six months or more. The composition cures at an elevated temperature in a matter of minutes or even seconds to a silicone elastomer. By elevated temperatures it is meant temperatures above 100° C.

It has been found that a properly inhibited addition curing composition can be very effective molding composition for liquid injection molding machines. Traditionally, liquid injection molding machines have been utilized with organic thermoplastic compositions. These thermoplastic compositions were taken at room temperature force fed into the mold either by the reciprocating screw type of injection molding machine or the ram plunger injection molding machine the plastic to be heated and melted and then the plastic being cooled in the mold to form a desired part. The organic plastic in the traditional injection molding machines was fed to the machine in pellets. The heat of the friction created by the plunger or ram, in the in injection molding machine caused the plastic pellets to melt and forced the plastic liquid out of the nozzle into the mold. The mold was then cooled so that the part came out as a solid thermoplastic part. Thermoplastic parts are then utilized for whatever purposes it was desired.

Such organic plastic liquid injection molding machines have found wide use in industry. It was found highly desirable to utilize silicone compositions in such injection molding machines to produce silicone parts with good high and low temperature properties. Accordingly, various types of machines have been designed or modified to produce liquid injection molding machines for silicones. It should be noted that silicone compositions differ from the traditional organic plastic compositions in the way they function in the molding machine in that they are liquid when introduced into the ram or plunger of the molding machine and that they are solidified by heating the mold to temperatures above 100° C. which causes the silicone composition to jell and cross-link to a silicone elastomer as distinguished from the cooling of the mold in the organic plastic compounds. One example of a reciprocating screw molding machine which was adapted for silicone compositions can be found in the patent application of A. A. Laghi, Ser. No. 159,262 filed on June 13, 1980. This application discloses a valve means adapted to a reciprocating screw molding machine for introducing silicone compositions into the screw of the molding machine and for preventing the back pressure in the liquid feed tanks from affecting the pressure in the screw plunger action on the silicone composition fed into the mold. Further, there was disclosed a seal modification on the screw plunger to keep the composition from leaking out from the backside of the screw plunger. These modifications were necessary in order to adapt the typical reciprocating screw plunger liquid injection molding machine so that it could utilize liquid compositions to form molded parts. In addition, the mold was heated so that the silicone composition was cured to a silicone elastomer.

Another type of a liquid injection machine that was modified to accept liquid silicone compositions was the plunger or ram type of liquid injection molding machine as disclosed in the patent application of A. A. Laghi, Ser. No. 183,620 filed September 2, 1980, now abandoned, which is hereby incorporated by reference. As this patent application discloses, there were made various modifications to a plunger or ram type of liquid injection molding machine so that it could utilize silicone compositions and such that the machine could feed even shots of composition into the silicone mold. Again, the mold was heated for silicone compositions.

True runnerless molds are known for organic plastics; but until the present time, true runnerless molds were not known for silicone compositions. It should be noted that molds for silicone compositions work differently from molds for organic plastics in that in silicone compositions, the mold has to be heated to cure the part whereas in organic plastic compositions, the mold is cooled to cure the part. Accordingly, the waste associated with prior liquid injection molding machines was eliminated by the advent of the molds of the present invention.

It is an object of the present invention to provide a runnerless mold for silicone liquid molding composition.

It is an additional object of the present invention to provide a mold for silicone injection molding compositions which does not waste material and which does not need the additional expense of a finishing operation to remove unwanted cured compositions from the molded part.

It is still an additional object of the present invention to provide a method for making a molded part from a silicone injection molding composition utilizing a runnerless mold.

It is yet an additional object of the present invention to provide a unique cut-off or shut-off means for a mold utilized in a liquid injection molding machine which is suited for silicone molding compositions.

These and other objects of the present invention are accomplished by means of the invention set forth in the enclosed figures:

FIG. 1—A partly schematic, partly perspective cross sectional view of a mold made in accordance with the present invention.

FIG. 2—A top cross sectional view of a mold or part of a mold apparatus made in accordance with the present invention.

FIG. 3—A cross-sectional view of the shut-off means of the mold of the present invention.

FIG. 4—A partly cross sectional view of the shut-off pin means and nozzle means of the molds of the present invention.

FIG. 5—A cross sectional top view showing the operation of the mold of the present invention.

FIG. 6—A top cross sectional view showing the operation of the shuttle plate in the mold of the present invention.

The above figures, as well as other aspects of the present invention will be explained by means of the disclosure set forth herein below.

SUMMARY OF THE INVENTION

In accordance with the above objects there is provided by the present invention, a mold apparatus for liquid injection molding compositions which is particularly suited for silicone liquid injection molding composition comprising:
  a frame;
  support posts means mounted on said frame having a front end and a rear end;
  a conduit for liquid molding composition slidably mounted on the forward end of said frame and on forward end of said mold frame means having a front end and a rear end;
  a first plate means having passage means therein for the passage of liquid composition fixedly mounted on the forward end of said conduit and adapted to slide within said support posts means and within said mold frame means and located adjacent to said forward end of said frame;
  nozzle means at the end of said passage means and said plate means adjacent to the rear end of said mold frame means away from said conduit means;
  pin means slidably mounted in said mold frame means adapted to open and close the nozzle means; and
  mold cavity means slidably mounted on said support means adapted to move toward and away from said nozzle means. It should be noted that the present mold apparatus is not solely limited to the utilization of silicone compositions. There can be utilized in the present mold any composition which is heated to effect cure. It should also be appreciated that compositions that are cooled to cure them can also be utilized in the present mold, such as organic plastics. However, the advantages of the instant mold lie in the utilization of compositions which are heated in the mold to cure them to the finish molded part such as for instance, silicone composition and particularly, the addition type of silicone composition discussed previously.

DESCRIPTION OF THE PREFERRED EMBODIMENT

Figure 1:
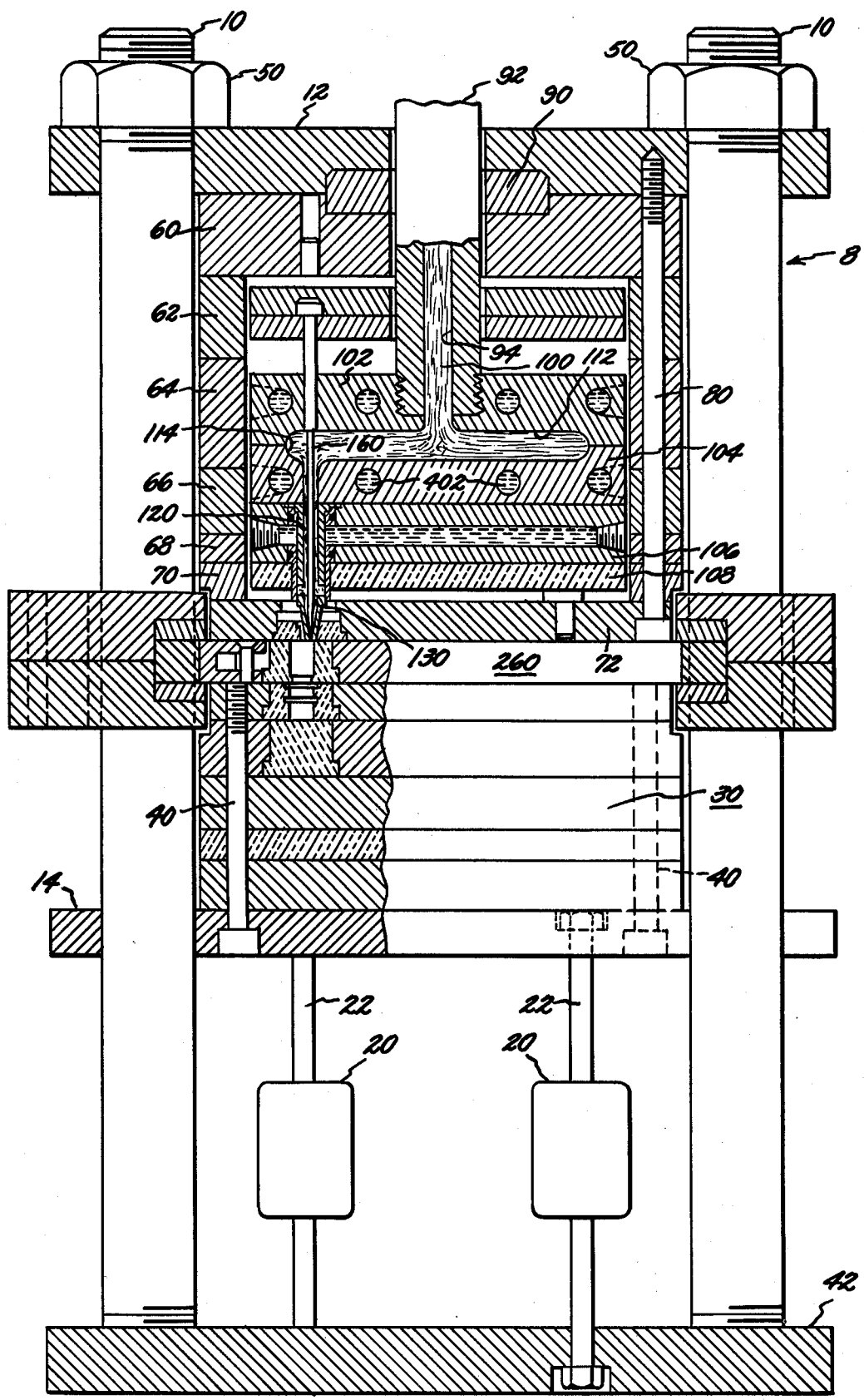

As has been noted, there is preferably utilized in the molds of the instant invention a silicone addition curing compositon. By silicone addition curing it is meant, compositions which contain as the basic ingredient 100 parts of a vinyl containing polysiloxane polymer and preferably a vinyl terminated polysiloxane polymer where the organic groups are selected from monovalent hydrocarbon radicals and wherein the polymer has a viscosity varying from 100–500,000 centipoise at 25° C. With this vinyl containing polymer, there is preferably utilized from 0.1 to 50 parts by weight of an organohydrogenpolysiloxane which can either be a hydride containing silicone resin or a hydride polysiloxane polymer. Examples of either hydride polysiloxane polymers or the hydride resin can be found in the patent of Jeram U.S. Pat. No. 4,041,010 which is hereby incorporated by reference. The hydride containing silicone resin can be either a resin composed of a monofunctional siloxy units and tetrafunctional siloxy units or can be a resin composed of monofunctional siloxy units, tetrafunctional siloxy units and difunctional siloxy units. The hydride polysiloxane may be a hydride polysiloxane containing hydrogen groups in the terminal positions of the polymeric chain as well as in the internal positions in the polymeric chain.

The hydride polysiloxane polymer has a viscosity in the neighborhood of 10–1,000 centipoise at 25° C. and more preferably has a viscosity varying from 10–100 centipoise at 25° C. The catalyst for such compositions is a platinum catalyst and preferably anywhere from 1–200 parts per million of a platinum catalyst is utilized any type of platinum catalyst, such as solid platinum deposited on charcoal or on gamma aluminum or it can be solubilized platinum complex such as disclosed in Lamoreoux U.S. Pat. No. 3,313,773. However, any useful platinum catalyst can be utilized in such reactions. The solubilized patent catalyst such as that disclosed in the foregoing Lamoreoux Patent is preferred since it is more active than the solid platium catalyst. In addition to the above ingredients, there can be in the composition vinyl containing resins, such as that disclosed in U.S. Pat. No. 3,436,366 which is hereby incorporated by reference. It should be noted that the basic polymers as well as the organohydrogenpolysiloxane may contain fluorine substituents such as 3,3,3, trifluoropropyl which gives the final cured silicone elastomer exceptional solvent resistance as well as the usual properties of silicones. Examples of such fluorosilicone addition curing compositions can be found in the foregoing general patents which are incorporated by reference.

In addition to the vinyl containing polymer the hydride polysiloxane and the platinum catalyst, there may be incorporated into the composition vinyl containing resins as reinforcing agents disclosed in the foregoing general patents. There can also be incorporated fillers, and specifically, reinforcing fillers. There may also be incorporated vinyl fluids which are terminated on one end with a vinyl unit and terminated on the other end of the polymer chain with a triorganosiloxy unit where in the organic group is saturated hydrocarbon groups such as methyl. The composition is usually packaged into a two packaged state in which the hydride and vinyl siloxane may appear in the same package but the platinum catalyst does not appear in that package. That is, there is no single package in which there is present both the vinyl containing polymer, the hydride polysiloxane and the platinum catalyst. If this occurs, then the composition cures to a silicone elastomer.

A compositon cannot be packaged and stored in that manner unless there is utilized a good inhibitor. Accordingly, in the addition curing compositions to be utilized in liquid injection molds both of the one component type and two component type, there is preferably utilized an inhibitor. Inhibitors of various types are disclosed in the patents set forth in the background of the invention. The invention is not limited to any specific inhibitor. Any type of additon curing composition may be utilized in which there is an inhibitor present such as to give the addition curing composition in the uncured state a good shelf life so that it may be pumped into the mold and cured therein at elevated temperatures without curing prematurely in the conduits of the mold prior to reaching the appropriate position for cure. Accordingly, there may be produced a two packaged composition or a one packaged composition having any suitable inhibitor such as allyl isocyanurate inhibitor, a maleate inhibitor or hydroperoxide compound inhibitor depending on the properties wich are desired for the addition curing composition.

It should also be noted, the molds of the present invention are not limited to being utilized solely with silicone compositions. They may be utilized with other types of composition and they may be modified so that the composition in the mold cavity is cooled instead of heated so that the molds of the invention can be utilized with organic plastics. However, as noted previously, the molds of the present invention are best suited for compositons which cure in the mold cavity by heating the mold and are particularly advantageous for utilization with silicone compositions and more specifically, addition curing silicone compositions as been described above.

Figure 5:
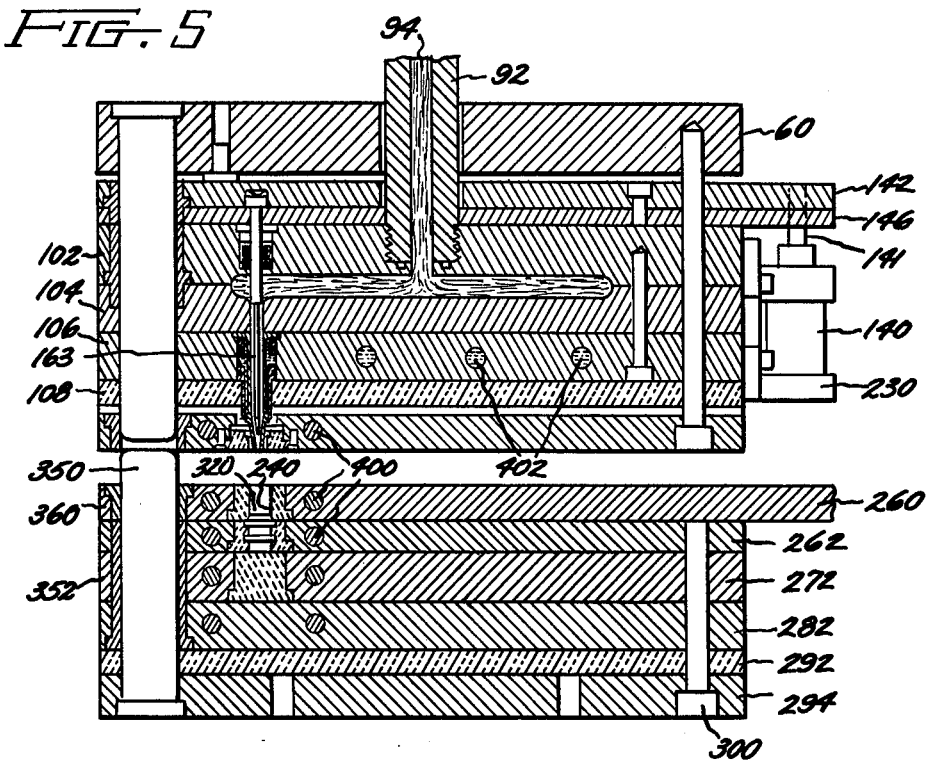
Figure 6:
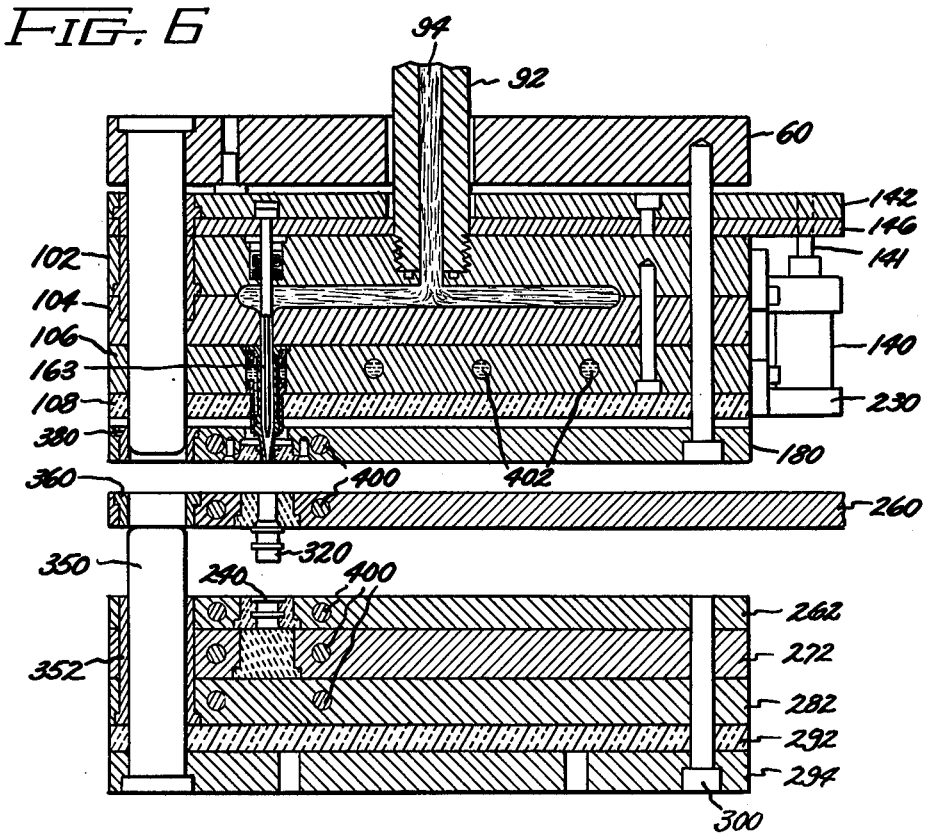

FIG. 1 shows a top partial cross sectional view of the apparatus showing tie bars 10 which are held in place by the frame 12. On the other end of the tie bar 10 movable plate 14 is moved by motors 20 through motor shafts 22 against mold cavity plates 30. Plate 14 which moves on tie bar 10 through motors 20 is attached to cavity plates 30 which are held together through bolts 40 as shown in FIGS. 5 and 6. Motors 20 are attached to the frame of the mold of the apparatus 42. At the front end of the mold apparatus of FIG. 1, tie bars 10 are held in place by nuts 50 which go on plates 12 and 42. The machine plate 12 are generally rectangular in shape or square in shape and are solidly connected to the machine frame. The front end of the mold 8 comprises a series of plates as seen in FIG. 1; plates 60, 62, 64, 66, 68, 70, and 72 which are held together in a stationary manner with respect to each of them and to plates 12 by bolts 80. Adjacent to plate 12 and next to plate 60, there is a central sleeve 90 in which slides conduit 92. Conduit 92 has a passageway 94 through which passes the silicone or other composition which is to form the molded part. The silicone composition being generally indicated as 100 in FIG. 1. Conduit 92 throughly engages movable plate 102, plate 102 being fixed to plate 104 which moves integrally with plate 106 to which is attached insulative layer 108. An insulative layer may be needed for proper insulation.

There is formed in plate 102 passageway 112 and in plate 104 passageway 114 which is integral with the other passageway and in plate 106 passageway 120 which is integral with a further passage 130 in insulative layer 108. The silicone composition passes from passageway 100 to passageway 114, passageway 120 and passageway 130 where it is allowed to pass into the mold as will be explained hereinafter. Plates 102, 104, 106 and 108 move integrally within the cavity indicated in the stationary plates 60, 62, 64, 66 and 68.

Figure 2:
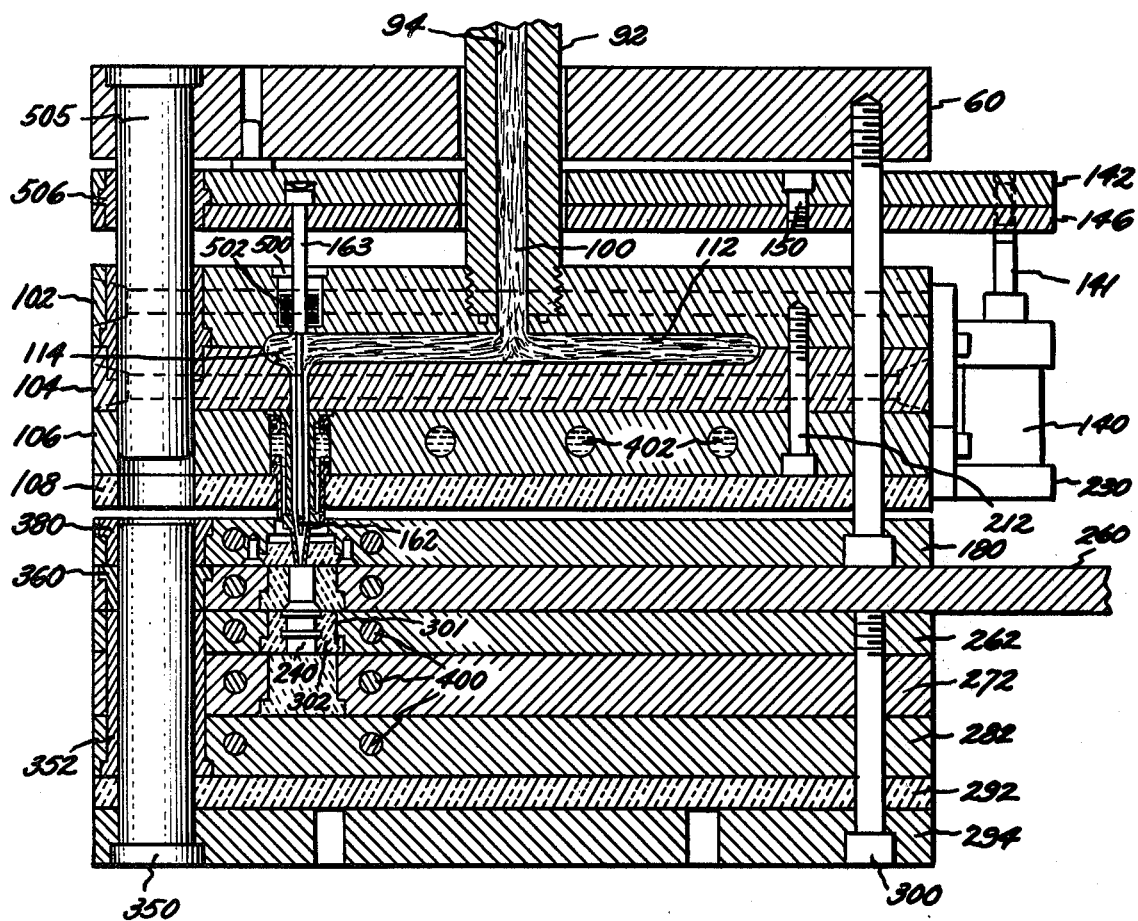

As more clearly seen in FIGS. 2, 5 and 6, hydraulic motor 140 moves plates 142 which moves integrally with plate 146 which are held together by bolt 150 so as to raise and lower the forward end 162 of pin 163 so as to open and close opening 170 so as to allow liquid composition to form the molded parts to pass through the passageways 100, 112, 114, 120, 130 which for simplicity shall be indicated in other figures as passageway 18 out through opening 170 forward end 162 of pin 163 is retracted as shown in FIG. 2. When the forward end 162 of pin 163 abuts the opening of 170 in passageway 130, then no liquid composition can enter the mold cavity. The forward end of this opening will be more fully explained in FIG. 4. In plate 180, which is stationary, there is nozzle 200, sleeve 202 which fits in bearing surfaces 204 and 206 which are present in plate 140 and in insulative layer 108 and in plate layer 104 and 106. The forward end 162 of pin 163 abuts the opening 170 in nozzle 200 to open and close the nozzle to allow liquid composition to pass through passageway 130 into the mold cavities 240 as more generally shown in FIG. 2 and which construction will be explained hereinafter.

Figure 3:
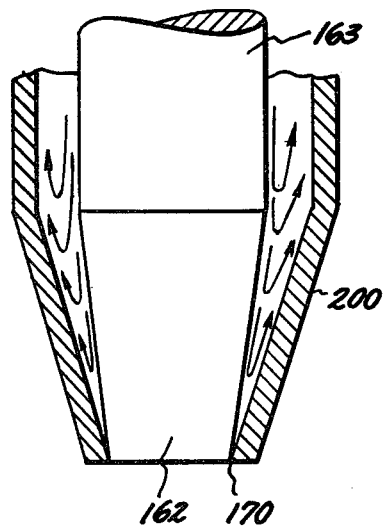

As seen in FIG. 3, the lower forward end 162 of pin 163 just fits the opening 170 of nozzle 200 and accordingly, when the forward end 162 abuts 170, no composition can leak out of nozzle 200 and thus cause dripping. Also as seen in FIGS. 2, 5 and 6, bolt 212 holds plates 102, 104, and 106 together so that they move intregrally with insulative layer 108. Members 141 and 230 are mounted on the side of the mold frame. The entire plates held together by bolt 212 are moved upward/downward by barrel 92 such that nozzle 200 is brought into contact with a mold 240 as shown in FIG. 2 or away from the mold cavity as shown in FIG. 6.

Motor 140 and connecting members 141 and 230 are intended to operate shut off piece 163. The motor frame 140 is slidably connected to the embodiment of plates held together by bolt 212. The position of the motor 140 is connected to plates 142 and 146 through connecting member 141. Plates 146 and 142 are operated by motor 140 so as to close and open the shut off valve 200 by moving downward/upward the shut off piece 163. Mold cavity 240 is located in plates 260, 262, 272, 282 with insulative layer 292 and plate 294. Plate 260 is the shuttle plate which removes the finished piece from the mold compendium of plates as seen in the figure. Plates 262, 272, 282, 292 and 294 are held together by bolts such as bolt 300 so that they move in unison. Shuttle plate 260 along with plates 262, 272 and 282 form opening 302 which is filled with the proper mold forming material such as hardness steel or titanium or other metals or plastics etc. and which forms the outer surfaces of the cavity 240 for the desired part. Surfaces 301 in opening 302 can be utilized to form the configuration for a particular type of molded part that is desired to mold in opening 302. Accordingly, the material so constructed as stated above can be utilized to form a particular type of mold cavity 240 so that a particular type of molded part can be formed in opening 302. It should be noted that the cavity 302 shown in FIG. 2 has a filler material in the different plates which forms the particular type of section that is desired the mold cavity form. In this manner, the entire mold need not be exchanged but only the filler material when it is desired to mold a part of a different configuration. In summary, all that is changed is the material 301 in opening 302 to form a different type or part that is desired to be molded other than the part that is shown in the figures of the instant case.

It should also be noted in FIG. 6, shuttle plate 260 is moved by means not shown away from plates 262 and 180 by means not showing which move it sideways.

Further, the force of the frictional resistance of the part 240 prevents it from detaching from the mold cavity as seen in FIG. 6 and from moving it from the cavity in shuttle plate 260 which force is greater than the force required to move it from its cavity in plate 262. Accordingly the part remains attached to plate 260 when plate 260 separates from plate 262. The means of the operation of the shuttle plate 260 will not be considered in the present case other than what has been given above. It should be noted that bottom plates 262, 272, 282, and 294 as well as shuttle plate 260 are aligned by guide pins 350 which are present in each corner of the mold. Guide pin 350 not only align the plates 262, 272, 282, 292 and 294 but also align shuttle plate 260 with above plates since the shuttle plate is not fixed to the bottom plates which move integrally. It should be noted that there are sleeves 352 in the opening in the foregoing plates for allowing pins 350 to move smoothly therein. There is a sleeves 360 in the opening in the shuttle plate 260 in which the opening through which pin 350 moves so as to align shuttle plate 260 with the rest of the plates. It should be noted that in the movement of shuttle plate 260, the entire plates of 262, 272, 282, 292 and 294 are moved back by motor 20 so as to remove pin 350 from the opening in plate 180 as well as opening in shuttle plate 260 so as to allow the shuttle plate 260 to move sideways so as to release the molded part 240. The opening in plate 180 through which shaft 350 passes also has a sleeves 380. The movement of the lower cavity plates 30 by motor 20 so as to allow shuttle plate 260 to move sideways to release the molded part 320 forms no part of the present invention and accordingly will not be discussed as stated previously. This invention will be disclosed in the patent application of A. A. Laghi, Ser. No. 272,424 filed June 10, 1981 and now U.S. Pat. No. 4,402,657. The part is removed from its mold cavity 302 as explained in FIG. 6 and is utilized for whatever purpose it was intended.

However, respective of this aspect of the present invention, the general configuration of the mold forms the process of this invention. The invention of the instant disclosure is the use of the pin 163 and the use of the movable conduit along with the plates 180, 102, 104, 106 and insulative layers 108 to move intregally therewith along with the coordinated movement of pin 163 so as to produce a runnerless injection mold. It should be noted that plates 180, 260, 262, 270, 272, 282, and 292 have channels therein 400 to which either flow heating fluids such as, for instance; hot oil, steam, or other media or heating is obtained by electric cartridges placed in the same heating channels. Heating media are utilized to heat the slicone molded composition in mold cavity 240 to form the molded part 320.

In addition, plates 102, 104, 106 contain cooling conduits 402 therein through which passes a cooling fluid for cooling the silicone composition that passes through the mold or other types of composition that passes through the passageway 112 in the plates so as to prevent premature curing. It should be noted that generally, by this cooling fluid such as the water, the temperature of composition 100 in passageway 112 is maintained as low as possible so as to prevent it from premature curing. Further, the heating fluid pass through heating channels 400 to raise the temperature of the mold cavity 240 in the neighborhood of 100° C. and above.

Figure 4:
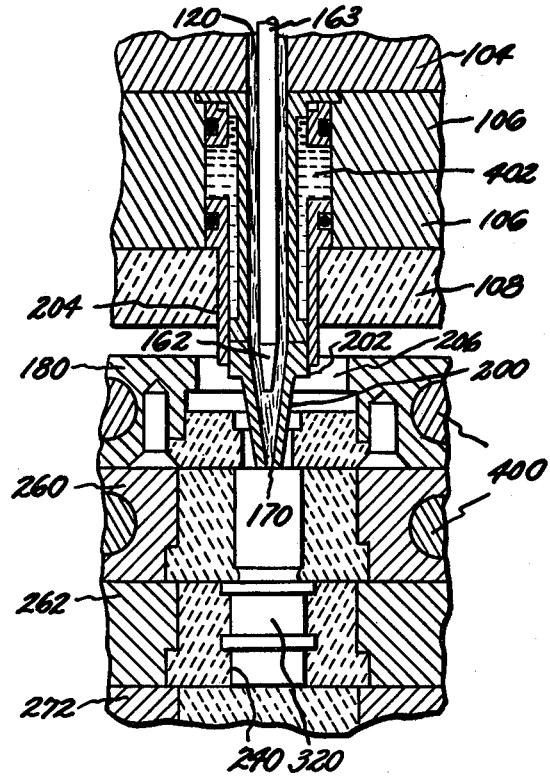

Now, considering the operation of the upper portion of the mold as seen in FIGS. 2, 4, 5 and 6, molding material such as silicone molding composition fluids pass through passageway 112 and it is kept from flowing forward by front end 162 of pin 163 which closes the opening 170 of nozzle 200 as shown in FIGS. 3 and 4. When the shuttle plate is moved back in alignment as shown in FIG. 3, then motor 20 moves the composition of plates 30 such that cavity 240 in shuttle plate 260 comes into contact with center plate 180. At that time, pin 350 passes through the opening in shuttle plate 260 and center plate 180 so as to align shuttle plate with the rest of the bottom plate 30. The machine barrel 92 moves the assembly of plates 102, 104 and 106 along with insulative layer 108 and carrying along with it nozzle 200 of cylinder 202 such that the opening 170 is in contact with the cavity 240 in shuttle plate 260. Nozzle 200 passes into opening 130 of plate 180. The hydraulic motor 140 through member 141 moves pin 163 and more particularly, moves the forward end 162 away from opening 170 so as to allow liquid composition to flow into mold cavity 240.

Through logic control of the apparatus when sufficient composition has been entered from passage 112 into cavity 240 through nozzle opening 170 or a predetermined amount of time has elapsed, then, hydraulic motor 140 through member 141 activates plates 142 and 146 so that they move pin 163 and particularly the forward part of 162 of pin 163 so as to contact with nozzle opening 170 so as to close the further passage of fluid silicone molding composition out of nozzle opening 170. It should be noted the pin 163 has the appropriate sleeve 500 and bearing surface 502 in plate 102 through which it passes. Accordingly, by this means, it is possible to have a runnerless operation for injection molding silicone composition into mold cavity 240. Going further on with the operation of the mold by logic control and hydraulic motor 140, forward end 162 of pin 163 closes nozzle opening 170 and machine barrel activates the compounds of mold plates 102, 104, and 106 so as to retract cylinder 202 and nozzle 200 away from opening 130 in plate 180. After curing time has elapsed, motor 20 moves the compound of lower plates 30 so that the shuttle plate 260 can operate to remove the molded part away from the mold. It should be noted that the upper set of mold plates as indicated in FIG. 2 also in the corner of the mold have pin 505 which slides in bores in the movable plates in 142, 146, 102, 104 and 106 and insulative layer 108 so as to properly align the movable plates with the stationary plates and to keep the plates and the channels in the movement of the individual plates from loosing alignment as they are moved by means of the barrel 92. It should be noted that the individual plates, as were the case with lower plates 30, also have sleeves such as sleeve 506 in plate 142 and plate 146.

The figures that are given show only one mold cavity 240. In the typical type of mold, in a single mold, there will be 16 such mold cavities and pins for controlling the flow into the mold cavity. Of course, there can be more or less but 16 has been found to be the convenient number such that the mold can be efficiently utilized to make 16 molded parts at a single time; thus, increasing the efficiency and output of the mold. Of course, the mold can be operated such that there is only one mold cavity and one pin in the mold. It should be noted that the figures as shown do not represent the cross sectional accordingly but only show partial cross sections so as to show the pertinent parts of the mold without showing the full 16 mold cavities and mold pins. For each such mold, there will be only central conduit 92. However, there will be a passageway 112 which will lead to 16 or more or less pins as the case may be and which will utilize the nozzle openings leading into 16 mold cavities or more or less as the case may be.

The principles of the present invention are set forth in the above figures.

As stated above, the above figures are not true cross sections of the entire molds but are done by taking sections along various lines to illustrate the necessary elements of the molds of the present case. For a fuller representation of the molds of these inventions one is referred to the figures in the co-pending application of Laghi, Docket 60 SO-485 which was referred to previously. Further, conduit 92 threadably attached and fixedly attached to plate 102 slidably movable in an opening in plate 12, 90, 142 and 146 and it moves integrally with a composition plates 102, 104, and 106 as well as insulative layer 108.

Accordingly by the utilization of the invention of this case, it is possible to produce a truly runnerless injection molded system for compositions which are heated to cure them to the molded part. This mold system can also be utilized with advantage for parts which are cooled to form the molded part. However, it has its most advantages in being utilized in which the composition is heated to form the molded part as in the case with silicone addition curing molding compositions.

I claim:

1. A mold apparatus for liquid injection molding compositions comprising:
  a frame having a forward and a rear end;
  support plate means mounted on said frame and supporting a support post means, said plate means having a forward end and a rear end;
  a mold frame means mounted on said support post means;
  a conduit for liquid molding composition slidably mounted on the forward end of said frame and on the forward end of said mold frame means;
  a first plate means having passage means therein for the passage of liquid molding composition and fixedly mounted on the forward end of said conduit and adapted to slide within said support post means and within said mold frame means and located adjacent said forward end of said frame;
  nozzle means at the end of said pasage means in said first plate means adjacent the rear end of said mold frame means away from said conduit means, said nozzle means including pin means slidably mounted in said mold frame means and adapted to open and close a nozzle opening means in said nozzle means; and
  mold cavity means slidably mounted on said support post means and adapted to move toward and away from said nozzle means.

2. The mold apparatus of claim 1 wherein said pin means is mounted on a second plate means and fixedly attached thereto at the rear end, said pin member passing through a bore in said first plate means and through part of said passage means in said first plate means such that the forward end of said pin member engages and disengages said nozzle opening means in said nozzle means.

3. The apparatus of claim 2 further including first drive means mounted on the side of said frame which moves said second plate means as required to open and close said nozzle opening and also motor means adapted to move said first plate means toward and away from said cavity mold means.

4. The apparatus of claim 3 further including second drive means mounted on said frame adjacent to the rear end of said support post means and adapted to move said nozzle means toward and away from said mold cavity means.

5. The apparatus of claim 4 wherein the forward end of said pin member fits in close proxmity to said nozzle opening means when said pin member closes said nozzle opening means such liquid composition cannot pass out of said nozzle opening means.

6. The apparatus of claim 5 wherein said mold cavity means comprises a series of plates held together by bolts and having the proper mold cavity therein.

7. The apparatus of claim 6 wherein said first and second plate means and mold cavity means have bores therein which guide parts so as to align the various plates in first and second plate means and in said mold cavity means.

8. The apparatus of claim 7 wherein said mold cavity means has a shuttle plate means adjacent said nozzle opening means of said first plate means and said mold cavity means so that they can be removed from the apparatus.

9. The apparatus of claim 8 wherein said first plate means has coolant passageways for passing coolant therethrough for cooling said liquid injection molding composition prior to its being injected in said mold cavity means.

10. The apparatus of claim 9 wherein said mold cavity means has passageways for passing or locating a heating media adjacent the mold cut-outs in said mold cavity means for heating the liquid composition in said mold cut-outs so as to cure it.

11. The apparatus of claim 10 wherein said first and second drive means are hydraulic motor means.

* * * * *